(12) United States Patent
Morrison et al.

(10) Patent No.: US 8,657,539 B2
(45) Date of Patent: Feb. 25, 2014

(54) ROUND CUTTING INSERT WITH REVERSE ANTI-ROTATION FEATURE

(75) Inventors: Lewis Ray Morrison, Latrobe, PA (US); Kumar Reddy Mylavaram Nikhilesh, Bangalore (IN); Suresh Mali, Bangalore (IN)

(73) Assignee: Kennametal Inc., Latrobe, PA (US)

(*) Notice: Subject to any disclaimer, the term of this patent is extended or adjusted under 35 U.S.C. 154(b) by 289 days.

(21) Appl. No.: 13/072,949

(22) Filed: Mar. 28, 2011

(65) Prior Publication Data
US 2012/0251250 A1    Oct. 4, 2012

(51) Int. Cl.
*B23C 5/20*    (2006.01)

(52) U.S. Cl.
USPC ............. 407/113; 407/42; 407/48; 407/62

(58) Field of Classification Search
CPC ................................. B23C 5/24; B23C 5/22
USPC .............. 407/113, 42, 48, 62, 61, 90, 81–84
See application file for complete search history.

(56) References Cited

U.S. PATENT DOCUMENTS

| | | | | |
|---|---|---|---|---|
| 1,460,030 | A | * | 6/1923 | Mattson .......................... 407/39 |
| 1,838,520 | A | | 12/1931 | Archer |
| 2,392,216 | A | * | 1/1946 | Anania ............................ 407/84 |
| 2,551,167 | A | | 5/1951 | Rolland |
| 2,630,725 | A | * | 3/1953 | Black .............................. 408/224 |
| 3,213,716 | A | * | 10/1965 | Getts ............................... 408/229 |
| 3,408,722 | A | | 11/1968 | Berry, Jr. et al. |
| 3,629,919 | A | | 12/1971 | Trevarrow, Jr. |
| 3,831,237 | A | | 8/1974 | Gunsalus |
| 3,842,470 | A | | 10/1974 | Hertel |
| 3,875,663 | A | * | 4/1975 | Gustafson et al. ............ 407/114 |
| 3,946,474 | A | | 3/1976 | Hahn et al. |
| 3,996,651 | A | | 12/1976 | Heaton et al. |

(Continued)

FOREIGN PATENT DOCUMENTS

| | | |
|---|---|---|
| DE | 3321184 A1 | 12/1984 |
| DE | 4244316 A1 | 6/1994 |

(Continued)

OTHER PUBLICATIONS

PCT/US2010/055247: International Search Report dated Jul. 21, 2011 (10 pages).

(Continued)

*Primary Examiner* — Daniel Howell
*Assistant Examiner* — Ryan Rufo
(74) *Attorney, Agent, or Firm* — Larry R. Meenan, Esq.

(57) ABSTRACT

A round cutting insert with a reverse anti-rotation feature that can be manufactured easily and inexpensively is disclosed. The round cutting insert includes a plurality of dimples formed on a first surface and another plurality of dimples formed on a second, opposing surface. The round insert is reversible and indexable. The round cutting insert is removable received in an insert receiving pocket in a tool body. The insert receiving pocket includes a single projection that is capable of being received in one of the plurality of dimples. The cooperation between the projection and one of the plurality of dimples prevents rotation of the round cutting insert when mounted in the insert receiving pocket. The plurality of dimples and the projection can be any desirable complimentary shape, such as a slot, a V-shape, a wagon wheel, a sports wheel, a pyramid, and the like.

15 Claims, 19 Drawing Sheets

(56) References Cited

U.S. PATENT DOCUMENTS

| | | |
|---|---|---|
| 4,189,264 A | 2/1980 | Kraemer |
| 4,202,650 A | 5/1980 | Erickson |
| 4,304,509 A | 12/1981 | Mori |
| 4,315,706 A | 2/1982 | Erkfritz |
| 4,632,593 A | 12/1986 | Stashko |
| 4,636,116 A * | 1/1987 | Shikata ........................ 407/103 |
| 4,812,087 A | 3/1989 | Stashko |
| 4,880,338 A | 11/1989 | Stashko |
| 4,915,548 A | 4/1990 | Fouquer et al. |
| 4,934,844 A | 6/1990 | Orii |
| 5,046,899 A | 9/1991 | Nishi |
| 5,147,158 A | 9/1992 | Rivière |
| 5,199,828 A | 4/1993 | Forsberg et al. |
| 5,236,288 A | 8/1993 | Flueckiger |
| 5,275,633 A | 1/1994 | Johansson et al. |
| 5,346,336 A | 9/1994 | Rescigno |
| D363,727 S | 10/1995 | DeRoche |
| 5,478,175 A | 12/1995 | Kraemer |
| 5,542,794 A | 8/1996 | Smith et al. |
| 5,558,142 A | 9/1996 | Ehrle et al. |
| 5,658,100 A | 8/1997 | Deiss et al. |
| 5,702,210 A | 12/1997 | Boianjiu |
| D390,578 S | 2/1998 | Satran et al. |
| 5,716,167 A | 2/1998 | Siddle et al. |
| 5,733,073 A | 3/1998 | Zitzlaff et al. |
| 5,772,365 A | 6/1998 | Vogel et al. |
| 5,772,366 A | 6/1998 | Wiman et al. |
| D396,479 S | 7/1998 | Satran et al. |
| 5,791,832 A | 8/1998 | Yamayose |
| 5,810,518 A | 9/1998 | Wiman et al. |
| 5,827,016 A | 10/1998 | Strand |
| 5,836,723 A | 11/1998 | Von Haas et al. |
| 5,846,032 A | 12/1998 | Murakami |
| 5,888,029 A | 3/1999 | Boianjiu |
| 5,915,889 A | 6/1999 | Kress et al. |
| 5,931,613 A | 8/1999 | Larsson |
| 5,934,844 A | 8/1999 | Woolley |
| D416,917 S | 11/1999 | Xie et al. |
| 6,050,751 A | 4/2000 | Hellstrom |
| 6,053,671 A | 4/2000 | Stedt et al. |
| 6,065,907 A | 5/2000 | Ghosh et al. |
| 6,123,488 A | 9/2000 | Kasperik et al. |
| 6,126,366 A | 10/2000 | Lundblad |
| 6,152,658 A | 11/2000 | Satran et al. |
| 6,158,928 A | 12/2000 | Hecht |
| 6,164,878 A | 12/2000 | Satran et al. |
| 6,168,356 B1 | 1/2001 | Sjoo et al. |
| D442,193 S | 5/2001 | Isaksson |
| 6,224,300 B1 | 5/2001 | Baxivanelis et al. |
| 6,234,724 B1 | 5/2001 | Satran et al. |
| 6,238,133 B1 | 5/2001 | DeRoche et al. |
| 6,343,898 B1 | 2/2002 | Sjöö et al. |
| 6,508,612 B1 | 1/2003 | Baca |
| 6,543,970 B1 | 4/2003 | Qvarth et al. |
| 6,579,042 B1 | 6/2003 | Shiraiwa |
| D477,004 S | 7/2003 | Arvidsson |
| 6,607,335 B2 | 8/2003 | Morgulis |
| 6,840,716 B2 | 1/2005 | Morgulis et al. |
| 6,926,472 B2 | 8/2005 | Arvidsson |
| 6,929,428 B1 | 8/2005 | Wermeister et al. |
| 6,948,889 B2 | 9/2005 | Arvidsson |
| 7,021,871 B2 | 4/2006 | Arvidsson et al. |
| D523,039 S | 6/2006 | Niebauer et al. |
| 7,070,363 B2 | 7/2006 | Long, II et al. |
| 7,073,987 B2 | 7/2006 | Hecht |
| 7,121,771 B2 | 10/2006 | Englund |
| 7,150,590 B2 | 12/2006 | Schäfer et al. |
| 7,156,006 B2 | 1/2007 | Hyatt et al. |
| 7,168,895 B2 | 1/2007 | Koskinen et al. |
| 7,300,232 B2 | 11/2007 | Wiman et al. |
| 7,306,409 B2 | 12/2007 | Stabel et al. |
| 7,325,471 B2 | 2/2008 | Massa et al. |
| 7,381,015 B2 | 6/2008 | Jonsson |
| 7,387,474 B2 | 6/2008 | Edler et al. |
| 7,390,149 B2 | 6/2008 | Wihlborg |
| 7,407,348 B2 | 8/2008 | Sjogren et al. |
| 7,458,753 B1 | 12/2008 | Niebauer et al. |
| 7,476,061 B2 | 1/2009 | Edler |
| 7,513,717 B2 | 4/2009 | Engström et al. |
| 7,530,769 B2 | 5/2009 | Kress et al. |
| 7,578,639 B2 | 8/2009 | Wiman et al. |
| 7,604,441 B2 | 10/2009 | Bhagath |
| 7,607,867 B2 | 10/2009 | Benson |
| 7,607,868 B2 | 10/2009 | Noggle |
| 7,722,297 B2 | 5/2010 | Dufour et al. |
| 7,785,045 B2 | 8/2010 | Viol |
| D638,452 S | 5/2011 | Morrison et al. |
| D640,717 S | 6/2011 | Morrison et al. |
| 7,959,383 B2 | 6/2011 | Choi et al. |
| 8,096,735 B2 | 1/2012 | Sladek et al. |
| D658,218 S | 4/2012 | Morrison et al. |
| 8,147,171 B2 | 4/2012 | Dufour et al. |
| D673,194 S | 12/2012 | Kovac et al. |
| 8,408,848 B2 | 4/2013 | Hecht |
| 8,430,607 B2 | 4/2013 | Jansson |
| 2003/0086766 A1 | 5/2003 | Andras |
| 2003/0219319 A1 | 11/2003 | Arvidsson |
| 2004/0028486 A1 | 2/2004 | Englund |
| 2005/0019110 A1 | 1/2005 | Astrakhan |
| 2005/0019113 A1 | 1/2005 | Wermeister |
| 2005/0084342 A1 | 4/2005 | Festeau et al. |
| 2005/0152754 A1 | 7/2005 | Wiman |
| 2005/0244233 A1 | 11/2005 | Jonsson |
| 2006/0088390 A1 | 4/2006 | Wallstrom et al. |
| 2006/0147269 A1 | 7/2006 | Sjogren et al. |
| 2006/0245837 A1 * | 11/2006 | Dufour et al. ................. 409/132 |
| 2006/0269374 A1 | 11/2006 | Dufour et al. |
| 2007/0009334 A1 | 1/2007 | Edler |
| 2007/0071559 A1 | 3/2007 | Koskinen |
| 2007/0101837 A1 | 5/2007 | Hyatt et al. |
| 2007/0122242 A1 | 5/2007 | Englund et al. |
| 2007/0189862 A1 | 8/2007 | Viol |
| 2007/0245535 A1 | 10/2007 | Noggle |
| 2008/0056831 A1 | 3/2008 | Wiman |
| 2008/0181731 A1 | 7/2008 | Wallstrom et al. |
| 2008/0193233 A1 | 8/2008 | Park |
| 2008/0317558 A1 | 12/2008 | Niebauer et al. |
| 2009/0052998 A1 | 2/2009 | Sladek |
| 2009/0097929 A1 | 4/2009 | Festeau et al. |
| 2009/0290946 A1 | 11/2009 | Zastrozynski |
| 2010/0034602 A1 | 2/2010 | Sung et al. |
| 2010/0061816 A1 | 3/2010 | Koerner et al. |
| 2010/0158620 A1 | 6/2010 | Spitzenberger et al. |
| 2010/0183386 A1 | 7/2010 | Heinloth et al. |
| 2010/0239379 A1 | 9/2010 | Choi et al. |
| 2010/0247257 A1 | 9/2010 | Paul et al. |
| 2011/0103905 A1 * | 5/2011 | Morrison et al. ................. 407/48 |
| 2011/0116878 A1 | 5/2011 | Ebert et al. |
| 2011/0164934 A1 | 7/2011 | Chen et al. |
| 2012/0003493 A1 | 1/2012 | Schon et al. |

FOREIGN PATENT DOCUMENTS

| | | | |
|---|---|---|---|
| DE | 19506944 A1 | 8/1995 | |
| DE | 69901623 T2 | 11/2002 | |
| DE | 102005025815 A1 | 12/2006 | |
| DE | 102006011581 | 9/2007 | |
| DE | 102008037915 B3 | 8/2009 | |
| DE | 102009049088 A1 | 4/2011 | |
| EP | 300172 A2 | 1/1989 | |
| EP | 0599393 A1 | 6/1994 | |
| EP | 698437 A1 | 2/1996 | |
| EP | 730926 A1 | 9/1996 | |
| EP | 1468770 A1 | 10/2004 | |
| EP | 1535681 A1 | 6/2005 | |
| JP | 63142944 | * 6/1988 | ............... B23C 5/20 |
| JP | 06190608 A | 7/1994 | |
| JP | 7299633 A | * 11/1995 | ............... B23C 5/10 |
| JP | 1119817 | * 1/1999 | ............... B23C 5/22 |
| JP | 11245105 A | 9/1999 | |
| JP | 1310808 A | 11/1999 | |
| KR | 1020060019993 A | 3/2006 | |
| SE | 533249 A1 | 7/2010 | |
| WO | 9415741 A1 | 7/1994 | |

(56) References Cited

FOREIGN PATENT DOCUMENTS

| | | |
|---|---|---|
| WO | 0128722 A1 | 4/2001 |
| WO | 2005068116 A1 | 7/2005 |
| WO | 2007037733 A1 | 4/2007 |
| WO | 2007104275 A1 | 9/2007 |
| WO | 2007127109 A2 | 11/2007 |
| WO | 2008029964 A1 | 3/2008 |
| WO | 2010017859 A1 | 2/2010 |

OTHER PUBLICATIONS

English Machine Translation of DE 10 2005 025 815.
English Machine Translation of DE 10 2006 011 581.

* cited by examiner

US 8,657,539 B2

ROUND CUTTING INSERT WITH REVERSE ANTI-ROTATION FEATURE

BACKGROUND OF THE INVENTION

The invention relates generally to cutting inserts and, more particularly, relates to round cutting inserts having a reverse anti-rotation feature for preventing rotation of the round cutting insert mounted onto the body of a cutting tool.

The inserts used in tools such as, for example, milling cutters are mounted in complementarily-shaped pockets spaced around the periphery of the tool body. The inserts are typically secured within their respective pockets by clamping screws inserted through a hole provided in the center of the insert. During a cutting operation, such inserts often experience not only compressive and vibratory forces, but some amount of torque due to the angle between the cutting edges of the inserts and the workpiece. For cutting inserts of non-round shapes, such torque does not result in the rotation of the insert due to the interference-type fit between the angled sidewalls of such inserts and the complementarily-shaped walls of the pocket that receive them.

By contrast, round inserts can rotate within their respective pockets since no such mechanical interference naturally arises between the cylindrical or frustro-conical sidewalls of round inserts and the corresponding circular walls of the pockets which receive them. The resulting rotation can loosen the clamping screw that secures the insert within its respective pocket. If the clamping screw should become sufficiently loosened, it can vibrate within the surrounding pocket severely enough to become chipped or cracked not only ruining the insert, but also jeopardizing the quality of the cut on the workpiece.

To prevent rotation of round inserts within their respective pockets, an anti-rotation feature in the form of a plurality of projections formed on the top and bottom surfaces of the insert. Although such an anti-rotation feature is effective to prevent rotation of the round insert in its respective pocket, such an anti-rotation feature is difficult to manufacture, thereby increasing the cost of both the cutting tool and round insert.

SUMMARY OF THE INVENTION

The problem of increased cost associated with anti-rotation features in the form of a plurality of projections has been solve by providing a round insert with a reverse anti-rotation feature in the form of recesses and a respective insert pocket with a projection for receiving one of the recesses to prevent rotation of the round insert when mounted in the insert pocket.

In one aspect, a round cutting insert comprises a first outer surface that terminates generally outwardly in a first cutting edge and terminates generally inwardly in a first inner edge; a first inner surface extending generally inwardly from the first inner edge toward a non-cylindrical opening that extends axially through the cutting insert; a plurality of first dimples formed in the first inner surface between the first inner edge and the opening; a second outer surface that terminates generally outwardly in a second cutting edge and terminates generally inwardly in a second inner edge; a second inner surface extending generally inwardly from the second inner edge; a plurality of second dimples formed in the second inner surface between the second inner edge and a central opening; and a generally circular side surface that extends between the first outer surface and the second outer surface, wherein one of the plurality of first dimples or one of the plurality of second dimples cooperates with a projection formed on a support surface of an insert receiving pocket in a tool body to prevent rotation of the cutting insert when mounted in the insert receiving pocket.

In another aspect, a cutting tool assembly comprises a tool body having an insert receiving pocket with a projection; and an insert received in the insert receiving pocket, the insert having a first portion having a first outer surface that terminates generally outwardly in a first cutting edge and terminates generally inwardly in a first inner edge; a first inner surface extending generally inwardly from the first inner edge toward a non-cylindrical opening that extends axially through the cutting insert; a plurality of first dimples formed in the first inner surface between the first inner edge and the opening; and a generally circular side surface that extends between the first outer surface and the second outer surface, wherein one of the plurality of first dimples cooperates with the projection of the insert receiving pocket to prevent rotation of the insert when mounted in the insert receiving pocket.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Below are illustrations and explanations for a method for manufacturing an insert pocket of a tool holder. However, it is noted that the fastener may be configured to suit the specific application and is not limited only to the example in the illustrations.

Figure 1:
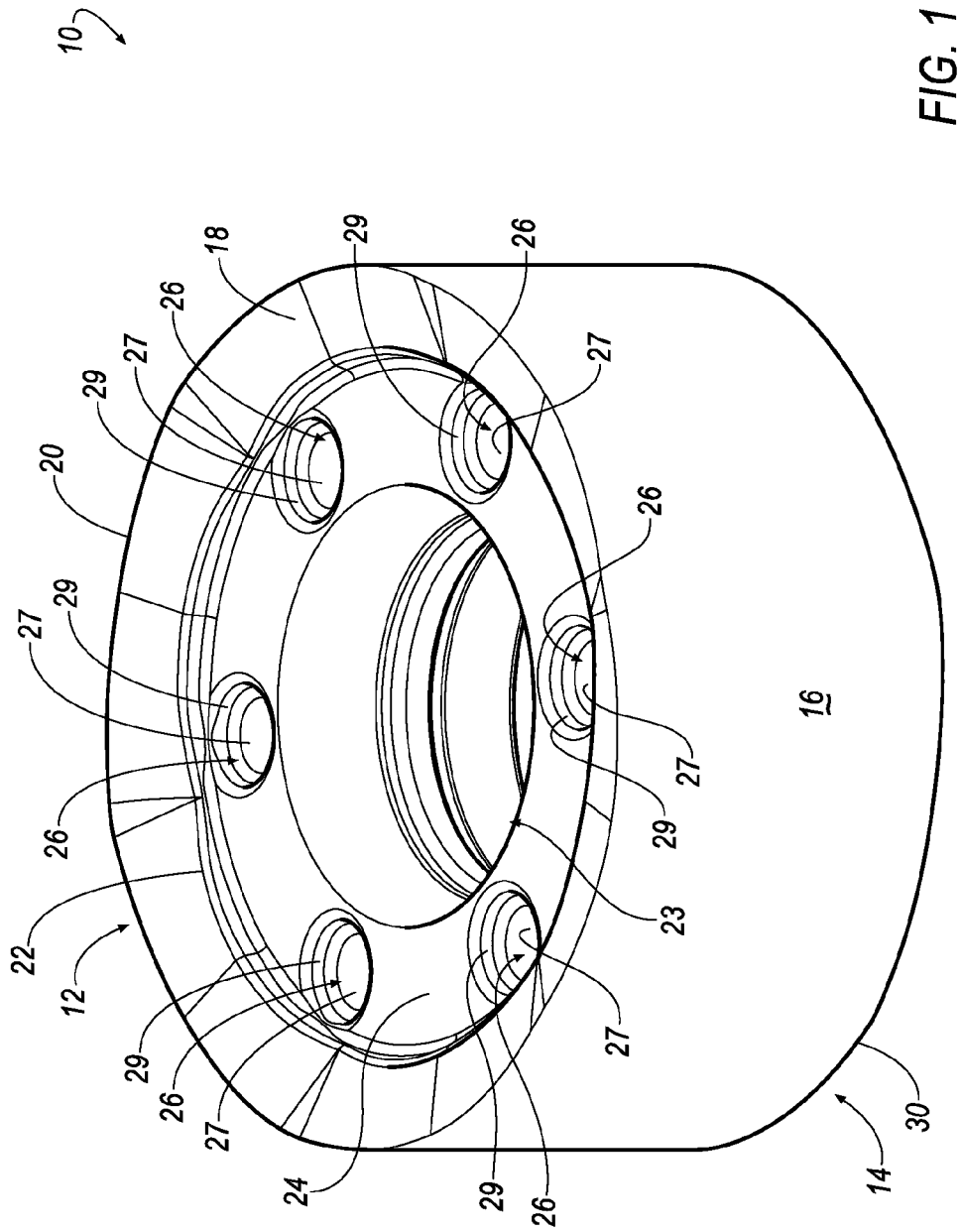
FIG. 1 is a perspective view of a cutting insert according to an aspect of the invention.
Figure 2:
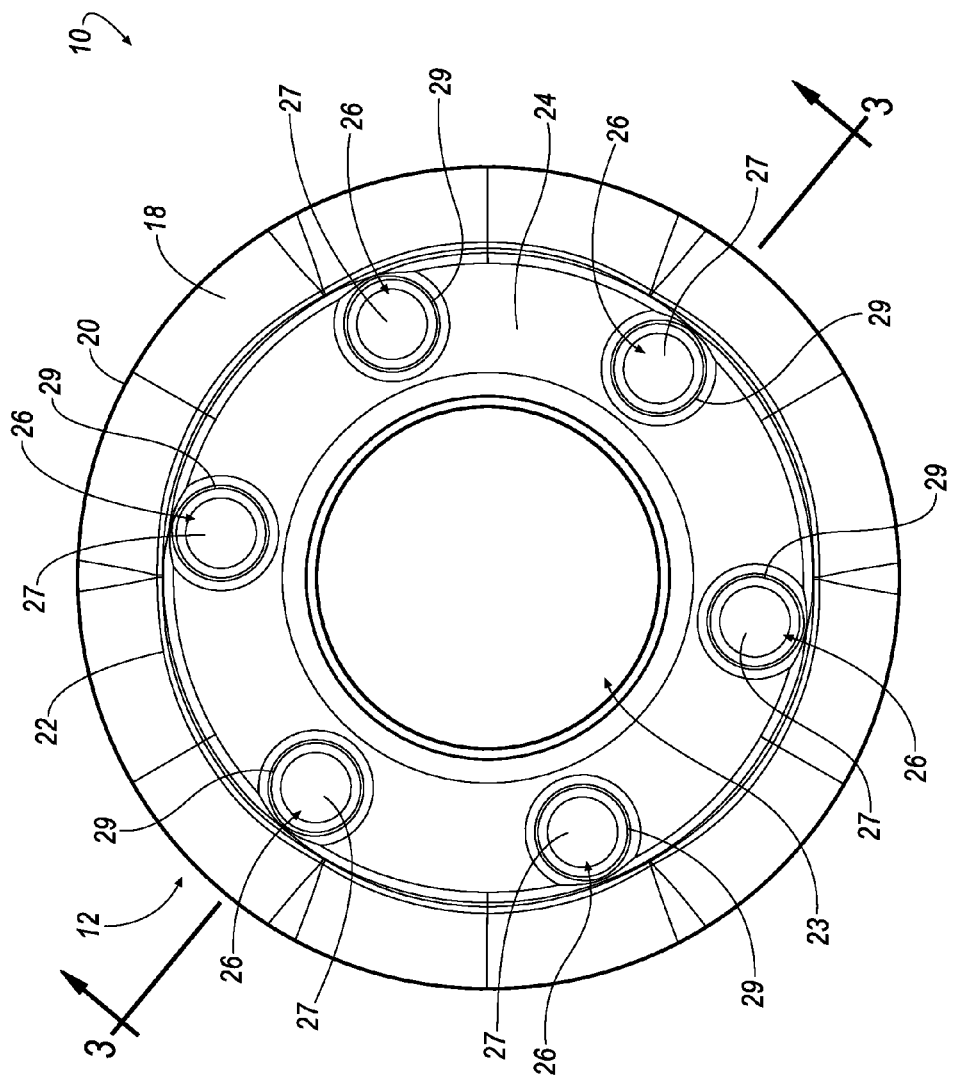
FIG. 2 is a top view of the cutting insert of FIG. 1 according to an aspect of the invention.

Referring to FIGS. 1 and 2, wherein like reference characters represent like elements, a cutting insert 10 is shown according to an embodiment of the invention. The cutting insert 10 includes a first or top portion 12 (see generally FIGS. 1, 2, 3 and 5) and a second or bottom portion 14 (see generally FIGS. 3, 4 and 5), and a generally circular side portion 16 that extends between the first portion 12 and the second portion 14. Thus, it will be appreciated that the cutting insert 10 is a generally round cutting insert for positioning in a tool body for performing a cutting operation on a workpiece (not shown).

As shown in FIGS. 1 and 2, the cutting insert 10 includes a first outer surface 18 that terminates in a generally outwardly direction in a first cutting edge 20 and terminates in a generally inwardly direction in a first inner edge 22. In one aspect, the first outer surface 18 slopes from the first cutting edge 20 toward the first inner edge 22. The cutting insert 10 also includes a first inner surface 24 that extends in a generally inwardly direction from the first inner edge 22 toward a non-cylindrical opening 23 that extends axially through the cutting insert 10. In one aspect, the first outer surface 18 may be contained in a plane and the first inner surface 24 may be contained in another plane that is non-parallel to the plane containing the first outer surface 18.

Figure 3:
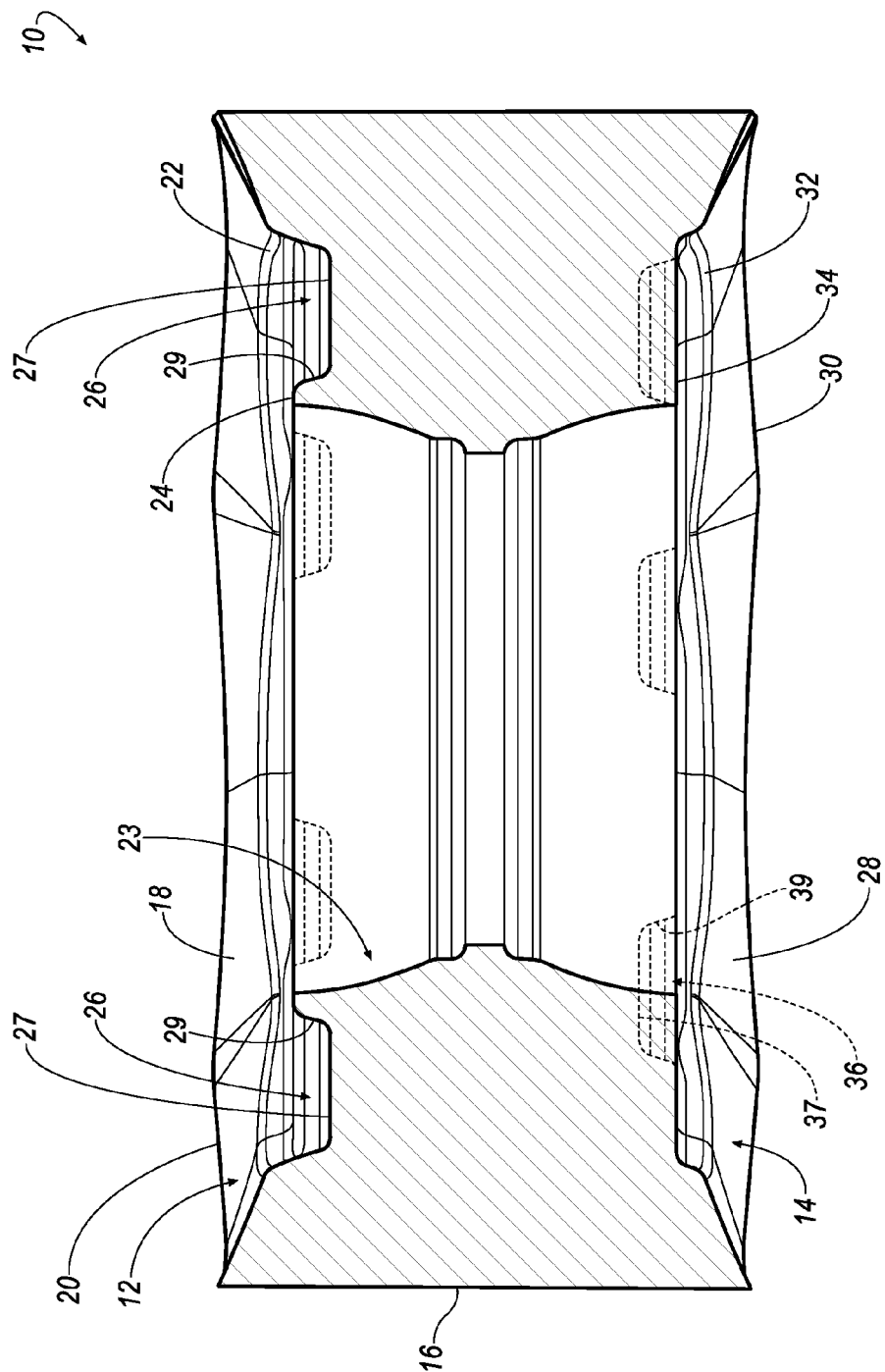
FIG. 3 is a cross-sectional view of the cutting insert illustrated in FIG. 2 taken along line 3-3.

The cutting insert 10 further includes a plurality of first round depressions or dimples 26. In one aspect, the plurality of first round dimples 26 are formed within the first inner surface 24. More specifically, the plurality of first round dimples 26 are centrally located between the first inner edge 22 and the opening 23 to provide clearance for the first cutting edge 20 when mounted in the tool body. In another aspect, the plurality of first round dimples 26 are evenly circumferentially spaced about the first inner surface 24. The first cutting edge 20 is circumferentially disposed about the plurality of first round dimples 26, and in one aspect each of the plurality of first round dimples 26 include a bottom surface 27 contained in a plane such that at least a portion of the first cutting edge 20 is contained in a different plane. Each of the plurality of first round dimples 26 also include a tapered sidewall surface 29 that extends between the first inner surface 24 and the bottom surface 27. As can be appreciated, the sidewall surface 29 is curved because the dimples 26 have a round profile. As seen in FIG. 3, the tapered sidewall surface 20 has a smaller cross-sectional area proximate the bottom surface 27 (i.e., distal the first inner surface 24), and a larger cross-sectional area distal the bottom surface 27 (i.e., proximate the first inner surface 24). In the illustrated embodiment, the cutting insert 10 includes a total of six (6) round dimples 26. However, it will be appreciated that the invention can be practiced with any desirable number of round dimples, depending on the dimensions of the cutting insert 10.

Figure 4:
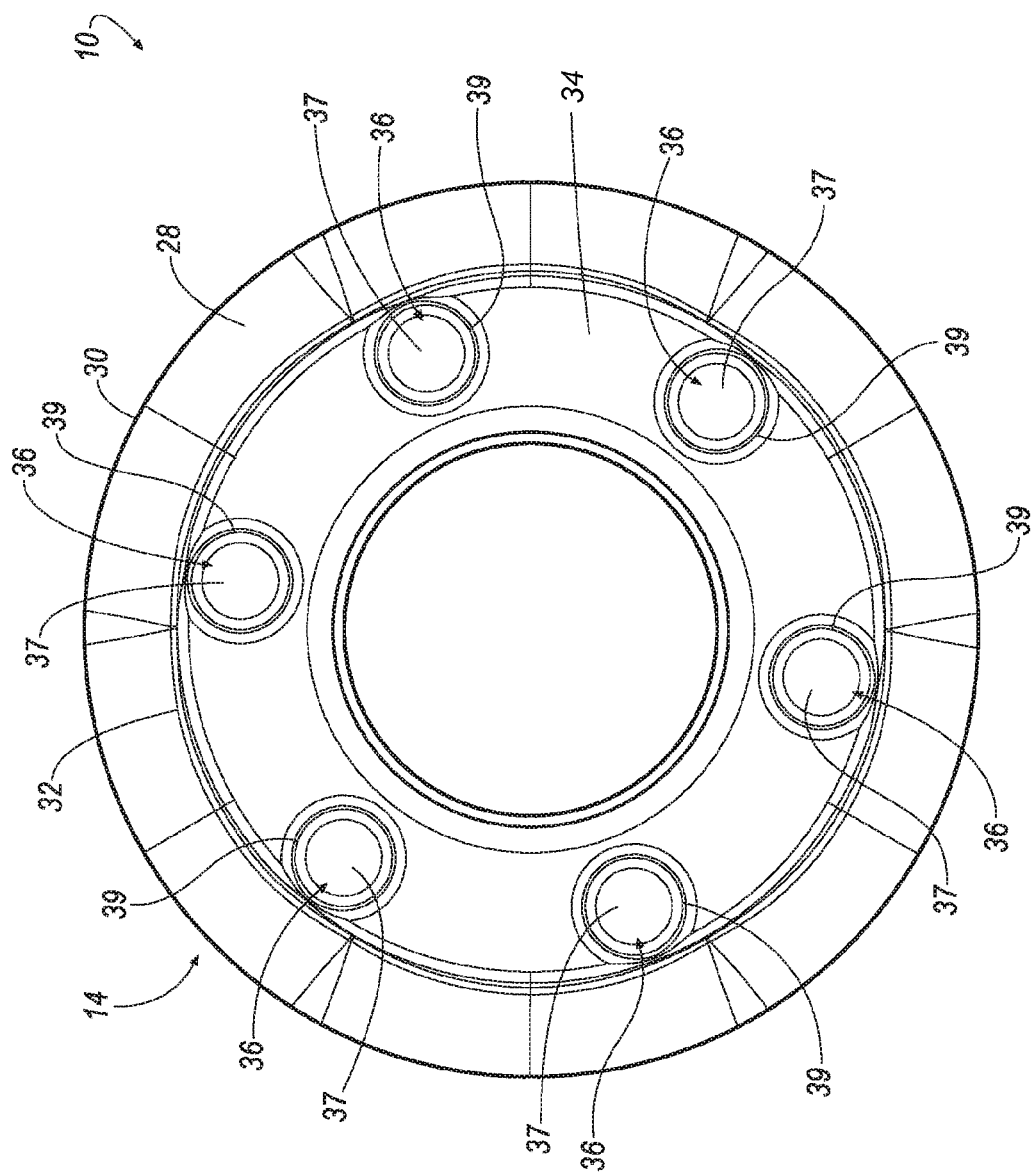
FIG. 4 is a bottom view of the cutting insert of FIG. 1 according to an aspect of the invention.
Figure 5:
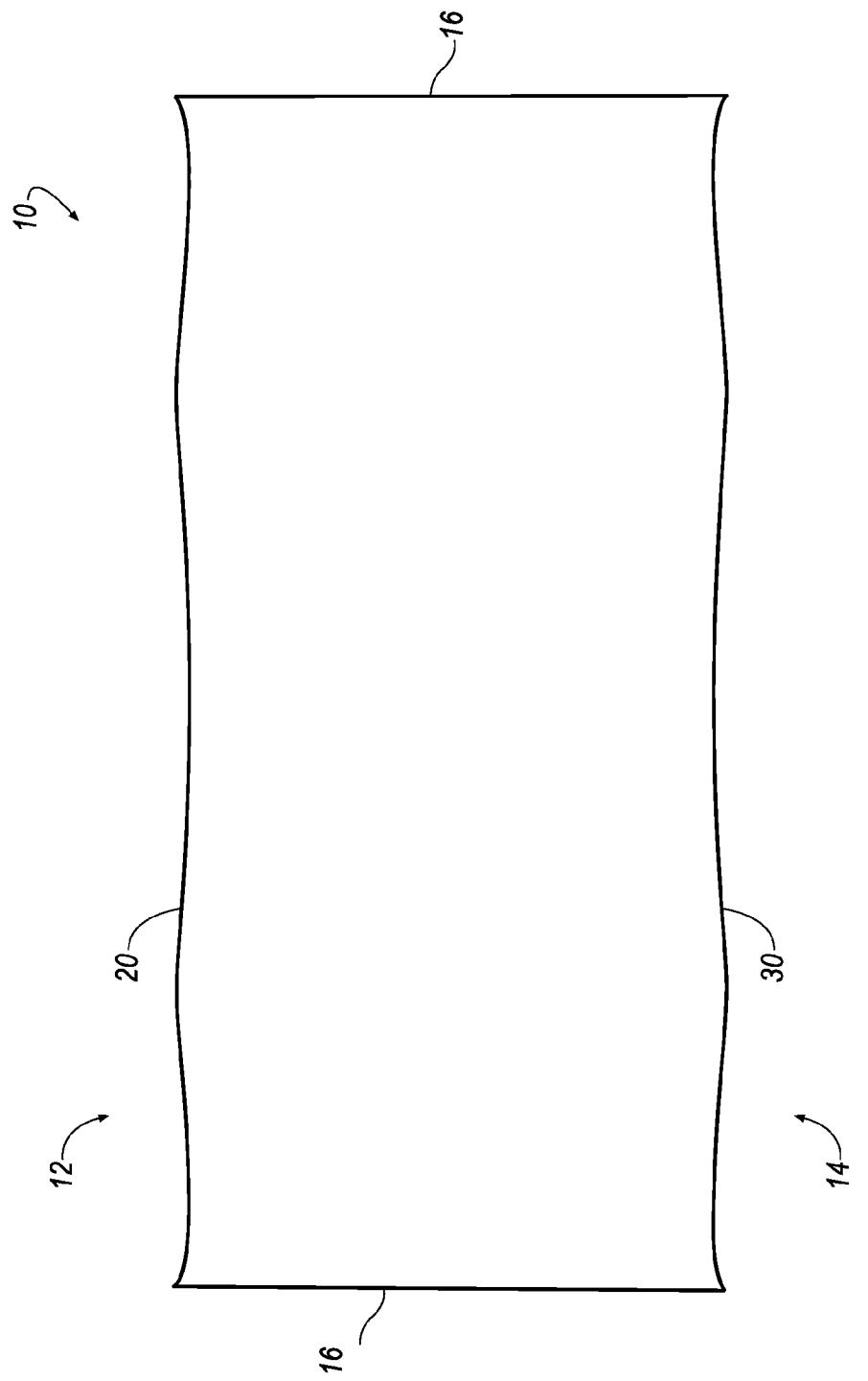
FIG. 5 is a side view of the cutting insert of FIG. 1 according to an aspect of the invention.

FIG. 4 illustrates the second or bottom portion 14 of the cutting insert 10. It will be appreciated that the second or bottom portion 14 is essentially identical to the first or top portion 12 that is illustrated, for example, in FIGS. 1 and 2. More specifically, as illustrated in FIG. 4, the second portion 14 of the cutting insert 10 includes a second outer surface 28 that terminates in a generally outwardly direction in a second cutting edge 30 and terminates in a generally inwardly direction in a second inner edge 32. In one aspect, the second outer surface 28 slopes from the second cutting edge 30 toward the second inner edge 32. The cutting insert 10 also includes a second inner surface 34 that extends in a generally inwardly direction from the second inner edge 32 toward the opening 23 that extends axially through the cutting insert 10. In one aspect, the second outer surface 28 may be contained in a plane and the second inner surface 34 may be contained in another plane that is non-parallel to the plane containing the second outer surface 28.

The cutting insert 10 further includes a plurality of second round dimples 36. In one aspect, the plurality of second round dimples 36 are formed within the second inner surface 34. More specifically, the plurality of second round dimples 36 are centrally located between the second inner edge 32 and the opening 23. In another aspect, the plurality of second round dimples 36 are evenly circumferentially spaced about the second inner surface 34. The second cutting edge 30 is circumferentially disposed about the plurality of second round dimples 36, and in one aspect each of the plurality of second round dimples 36 include a bottom surface 37 contained in a plane such that at least a portion of the second cutting edge 30 is contained in a different plane. Each of the plurality of second round dimples 36 also include a tapered sidewall surface 39 that extends between the second inner surface 34 and the bottom surface 37. As can be appreciated, the sidewall surface 39 is curved because the dimples 36 have a round profile. As seen in FIG. 3, the tapered sidewall surface 39 has a smaller cross-sectional area proximate the bottom surface 37 (i.e., distal the second inner surface 34), and a larger cross-sectional area distal the bottom surface 37 (i.e., proximate the second inner surface 34). In the illustrated embodiment, the cutting insert 10 includes a total of six (6) round dimples 36. However, it will be appreciated that the invention can be practiced with any desirable number of round dimples, depending on the dimensions of the cutting insert 10.

Figure 6:
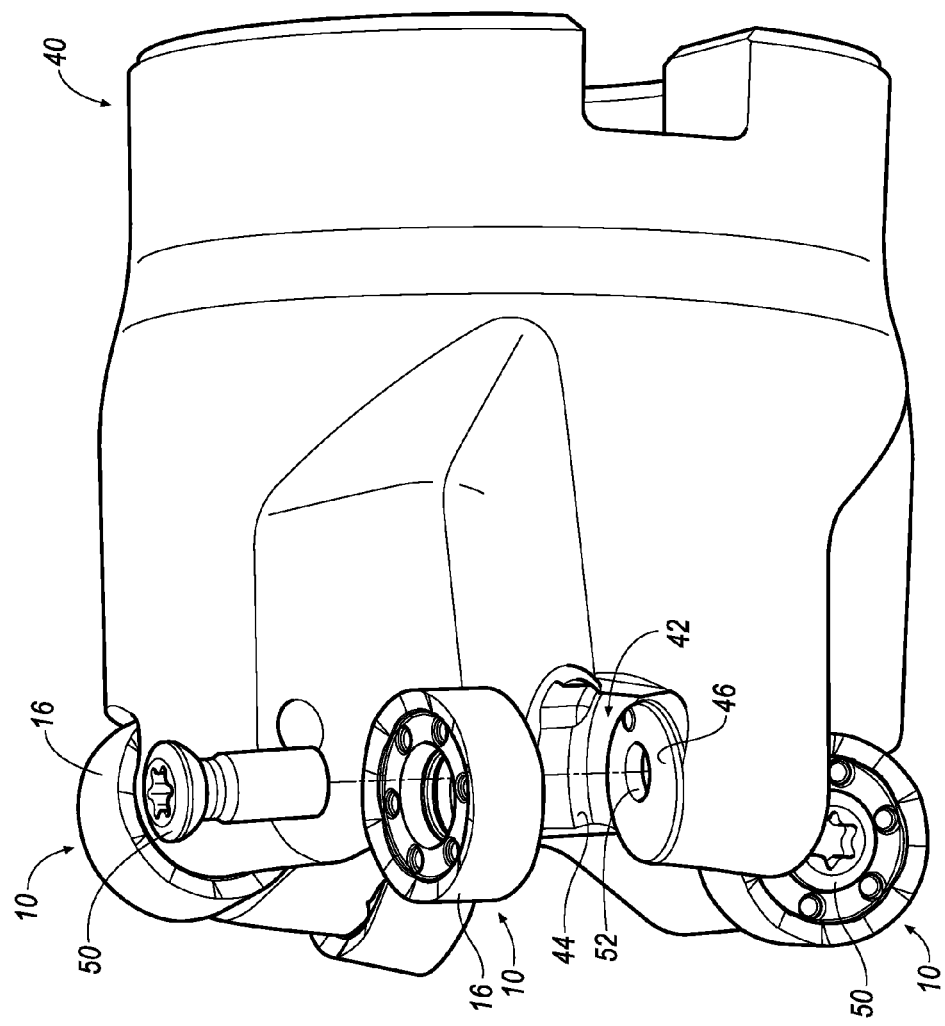
FIG. 6 is an elevational view of a cutting tool assembly according to an aspect of the invention.
Figure 7:
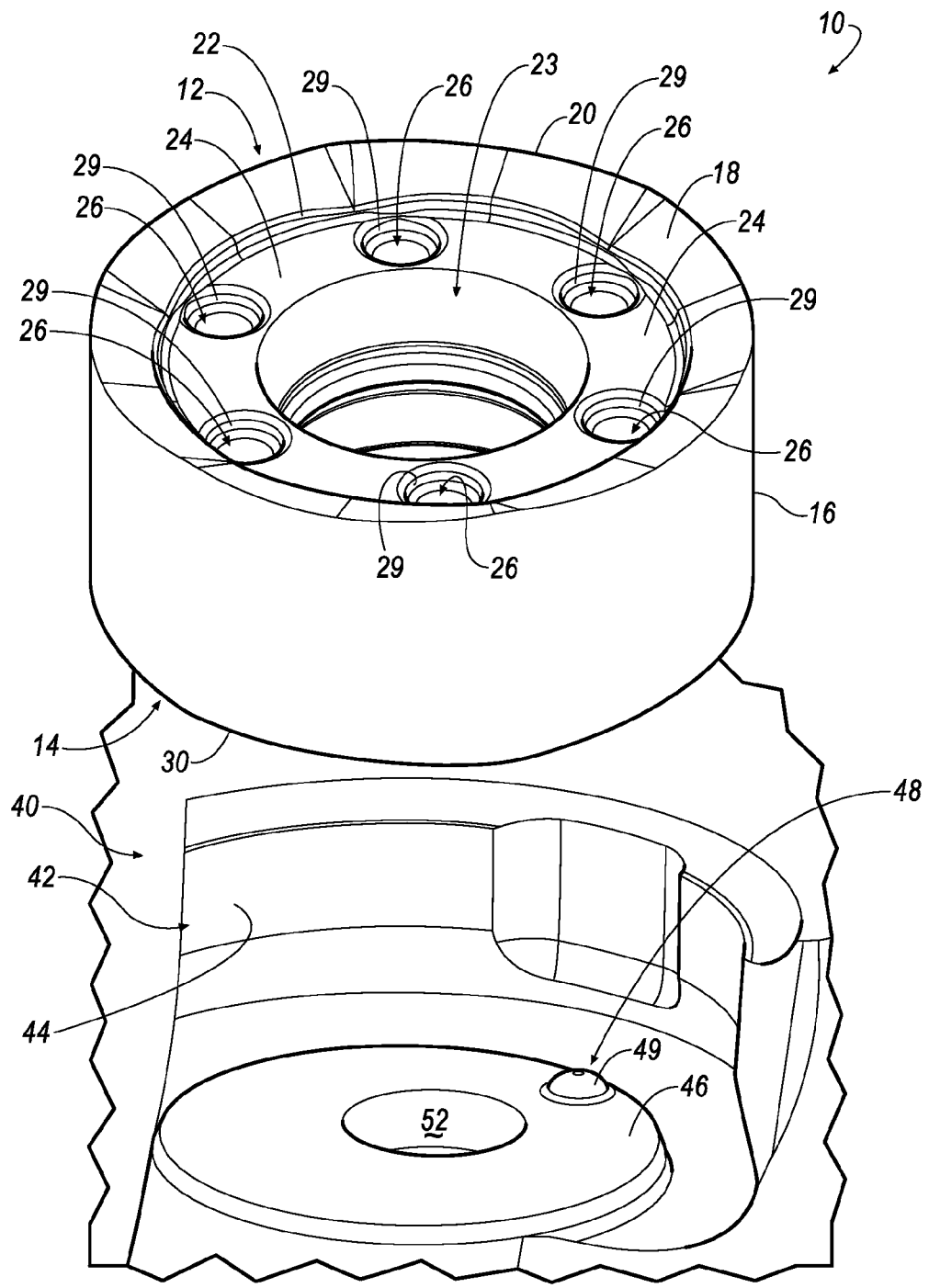
FIG. 7 is a partial, exploded view of a portion of the cutting tool assembly illustrated in FIG. 6.

Referring now to FIGS. 6 and 7, there is illustrated a cutting tool assembly with a plurality of the cutting inserts 10 are mounted to a tool body 40. More specifically, the cutting inserts 10 are removably mounted in an insert receiving pocket 42 of the tool body 40. The insert receiving pocket 42 includes a sidewall 44 and a support surface 46. The generally circular side portion 16 of the cutting inserts 10 are received in the insert receiving pocket 42 adjacent to the sidewall 44. In addition, one of first inner surface 24 or second inner surface 34 of the cutting insert 10 is received and supported on the support surface 46 of the insert receiving pocket 42.

In one aspect, one of the first inner surface 24 or the second inner surface 34 of the cutting inserts 10 are received and supported on the support surface 46 of the insert receiving pocket 42. More specifically, the support surface 46 includes a single round bump or projection 48 formed on the support surface 46 for mating and cooperating with one of the plurality of first round dimples 26 or one the plurality of second round dimples 36. In one aspect, the round projection 48 is formed on the support surface 46 to create a raised profile projection.

It will be appreciated that if the round projection 48 is received in one of the plurality of first round dimples 26, then the second cutting edge 30 is positioned to perform a cutting operation. Similarly, if the round projection 48 is received in one of the plurality of second round dimples 36, then the first cutting edge 20 is positioned for performing a cutting operation. Accordingly, it will be appreciated that the cutting insert 10 is reversible and provides for the first cutting edge 20 and the second cutting edge 30 so as to provide for a longer life of operation for the cutting insert 10.

A fastening screw 50 is provided for extending through the opening 23 of the cutting insert 10 and being received in a fastening hole 52 of the insert receiving pocket 42. The fastening screw 50 provides for removably securing the insert 10 to the tool body 40 and, more particularly, for removably securing the cutting insert 10 to the insert receiving pocket 42 of the tool body 40.

As described herein, one of the plurality of first dimples 26 or the plurality of second dimples 36 is received in the projection 48 of the insert receiving pocket 42. Once the fastening screw 50 is positioned to secure the cutting insert 10 in the insert receiving pocket 42, the cooperation between one of the plurality of first dimples 26 or the plurality of second dimples 36 and the projection 48 prevents rotation of the insert 10 due to the projection 48 being received in one of the corresponding plurality of dimples 26, 36. Advantageously, the cutting insert 10 is therefore unable to rotate within the insert receiving pocket 42 during a cutting operation and thus providing the anti-rotation feature of the invention.

In addition, the sidewall 29 of each dimple 26 cooperates with a sidewall 49 of the projection 48. Similarly, the plurality of second dimples 36 each includes a sidewall 39 for cooperating with the sidewall 49 of the projection 48. Advantageously, this arrangement further prevents the cutting insert 10 from rotating when mounted in the insert receiving pocket 42.

In accordance with another aspect of the invention, the cutting insert 10 is indexable for both the first cutting edge 20 or the second cutting edge 30. For example, once a portion of either the first cutting edge 20 or the second cutting edge 30 has been used, then the fastening screw 50 can be loosened and the cutting insert 10 lifted such that either the first round dimples 26 or the second round dimples 36 are removed from the round projection 48 and then the cutting insert 10 can be turned or rotated and the first round dimples 26 or the second round dimples 36 reinserted into the round projection 48 followed by the fastening screw 50 being reinserted as well. By providing for the plurality of first round dimples 26 or the plurality of second round dimples 36, a user can easily identify how much the cutting insert 10 is rotated during the indexing of the cutting insert. It will be appreciated that the first round dimples 26 are generally opposed to the second round dimples 36 in order to allow the user to accurately position one of the plurality of first round dimples 26 or one of the plurality of second round dimples 36 within the round projection 48.

It will be appreciated that the single projection 48, rather than a plurality of projections or other features, enables the manufacturing of the insert receiving pocket 42 to be much easier and less costly as compared to a conventional insert pocket. In addition, the single projection 48 causes the cutting insert 10 to be much more raised if the cutting insert 10 is not seated properly in the insert receiving pocket 42, thereby providing an error correction feature of the invention.

It will be appreciated that the invention is not limited by the plurality of first dimples 26, the plurality of second dimples 36 and the projection 48 having a round or spherical geometric profile, and the invention can be practiced with a cutting insert 10 having any desirable geometric profile, so long as the geometric profile of the reverse anti-rotation feature on the cutting insert is capable of cooperating with the geometric profile of the reverse anti-rotation feature on the insert receiving pocket.

Figure 8:
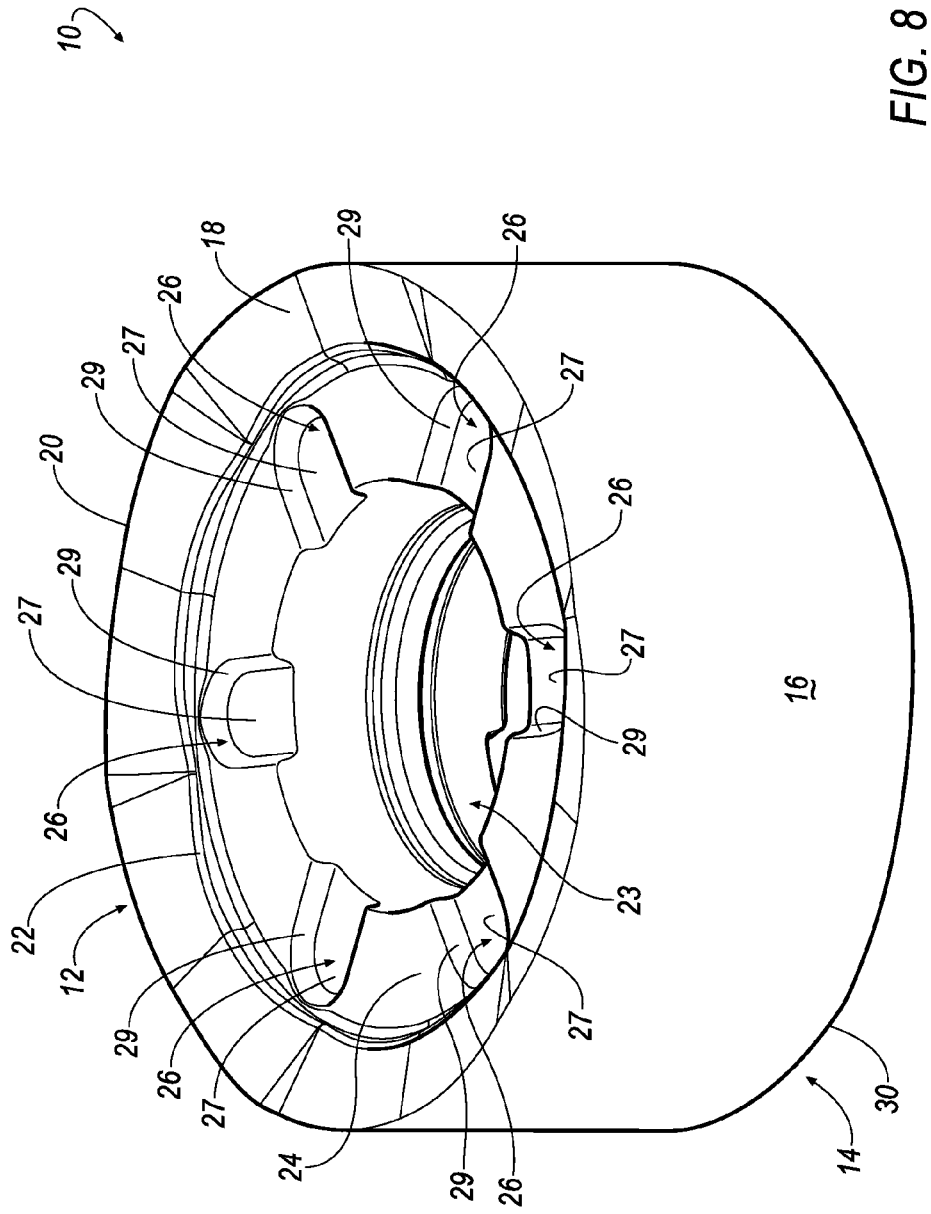
FIG. 8 is a perspective view of a cutting insert according to another aspect of the invention.
Figure 9:
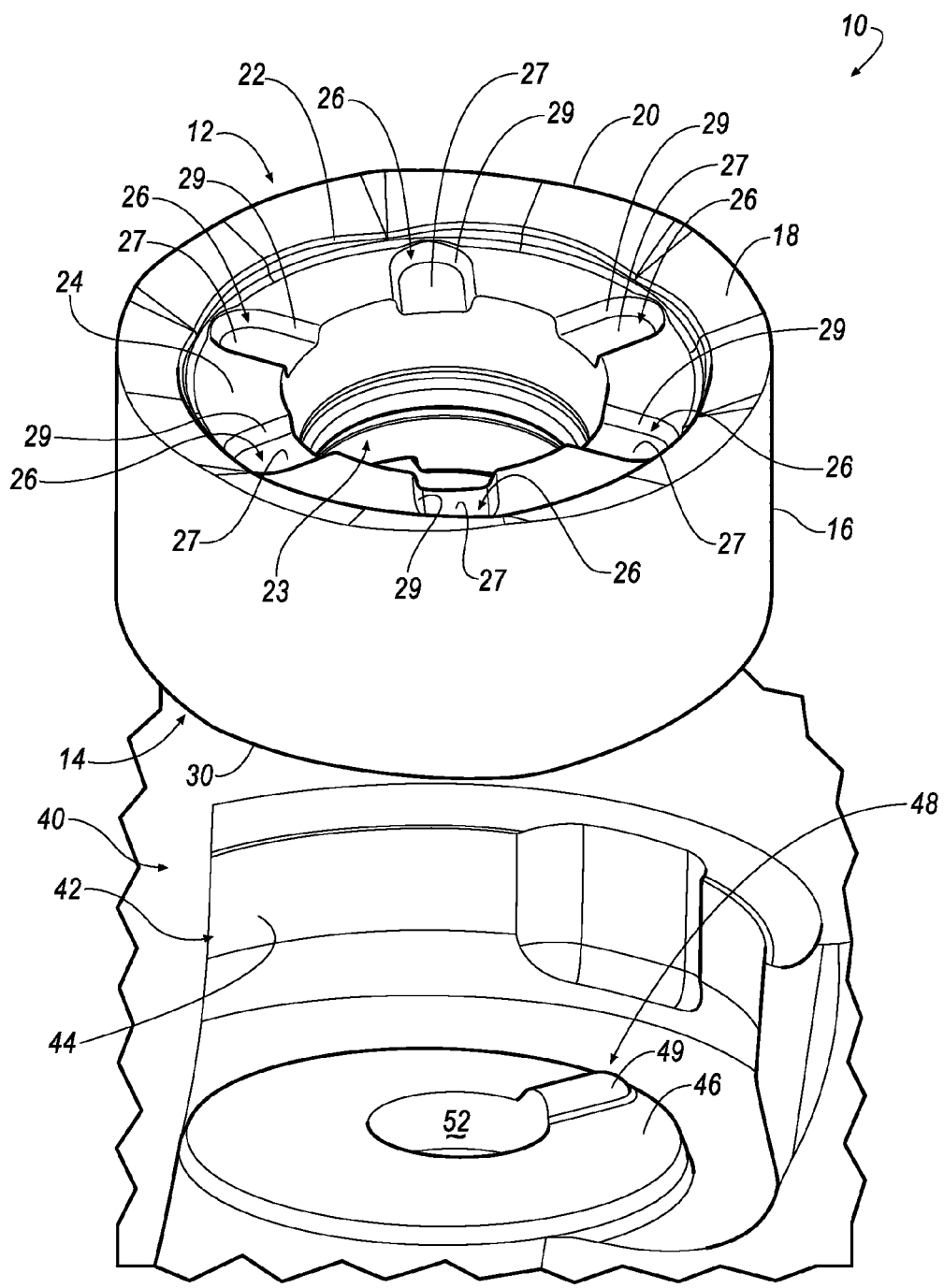
FIG. 9 is a partial, exploded view of a portion of the cutting tool assembly illustrated in FIG. 6 and the cutting insert illustrated in FIG. 8.

For example, the plurality of first dimples 26, the plurality of second dimples 36, and the projection 48 on the insert receiving pocket 42 can have a slot geometric profile, as shown in FIGS. 8 and 9. In this example, the plurality of first dimples 26 and the plurality of second dimples 36 having the slot profile cooperates with the single projection 48 on the insert receiving pocket 42 having a complementary slot profile to prevent rotation of the cutting insert 10 when mounted in the insert receiving pocket 42.

Figure 10:
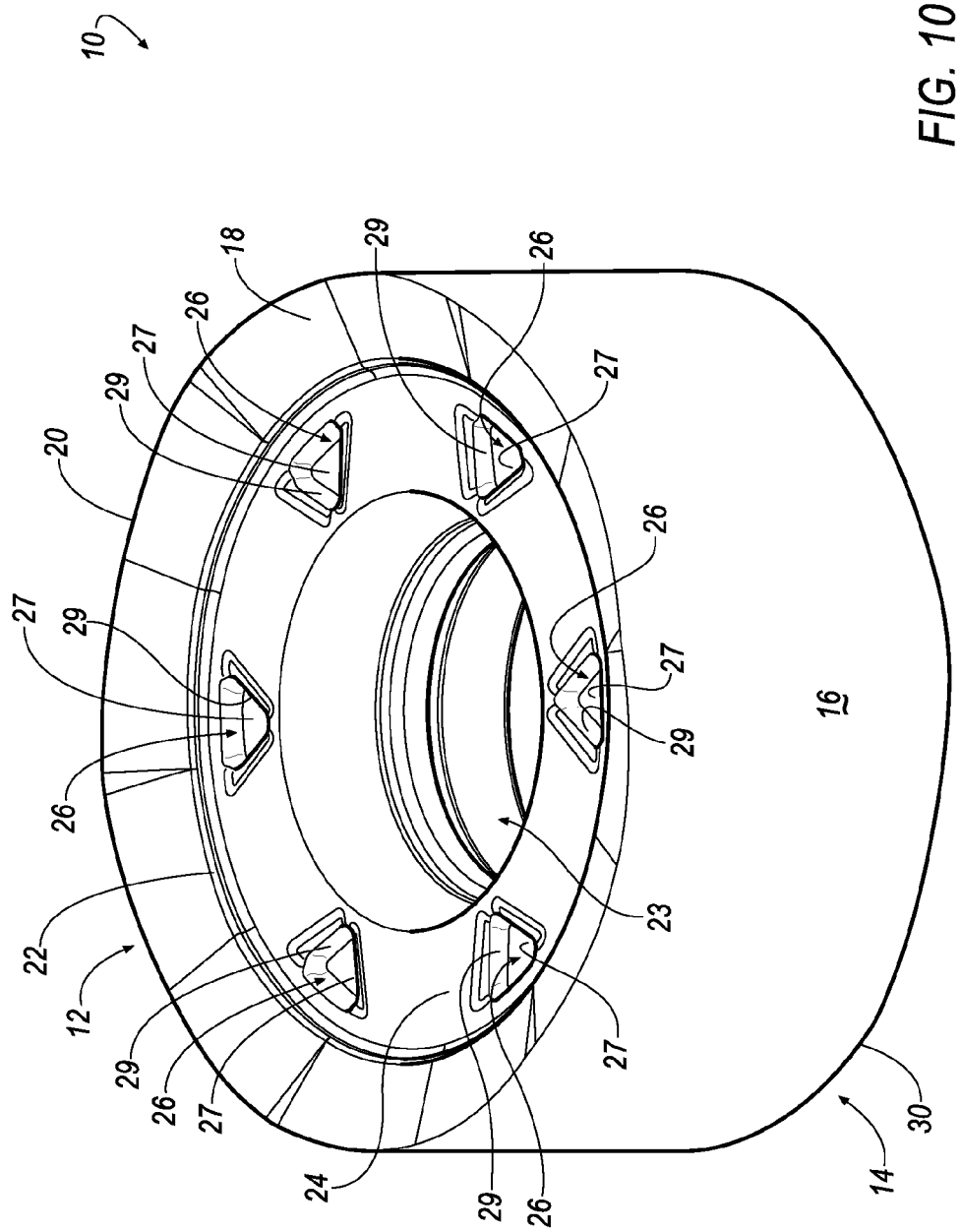
FIG. 10 is a perspective view of a cutting insert according to another aspect of the invention.
Figure 11:
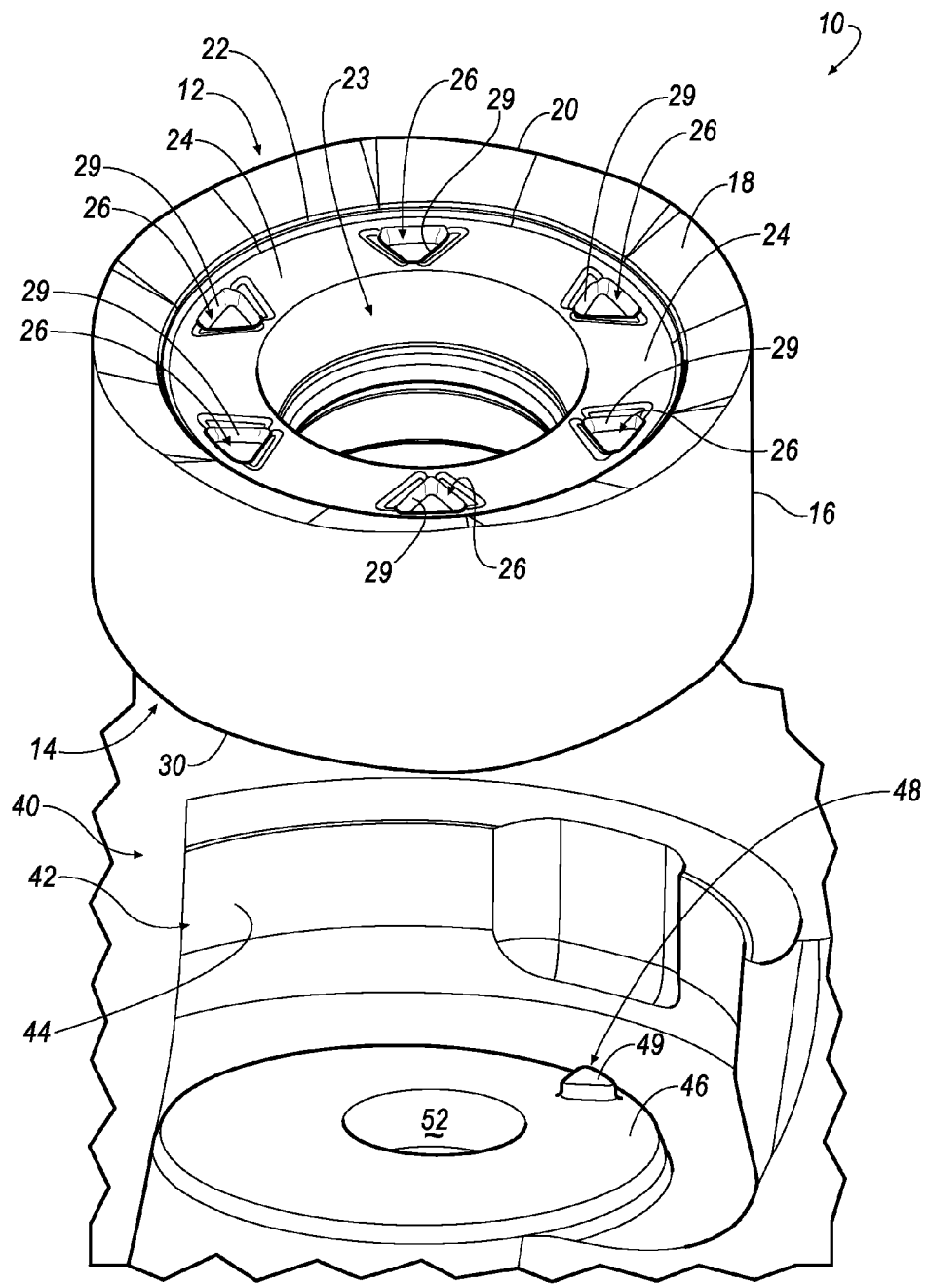
FIG. 11 is a partial, exploded view of a portion of the cutting tool assembly illustrated in FIG. 6 and the cutting insert illustrated in FIG. 10.

In another example, the plurality of first dimples 26, the plurality of second dimples 36, and the projection 48 on the insert receiving pocket 42 can have a V-shaped geometric profile, as shown in FIGS. 10 and 11. In this example, the plurality of first dimples 26 and the plurality of second dimples 36 having the V-shaped profile cooperates with the single projection 48 on the insert receiving pocket 42 having a complementary V-shaped profile to prevent rotation of the cutting insert 10 when mounted in the insert receiving pocket 42.

Figure 12:
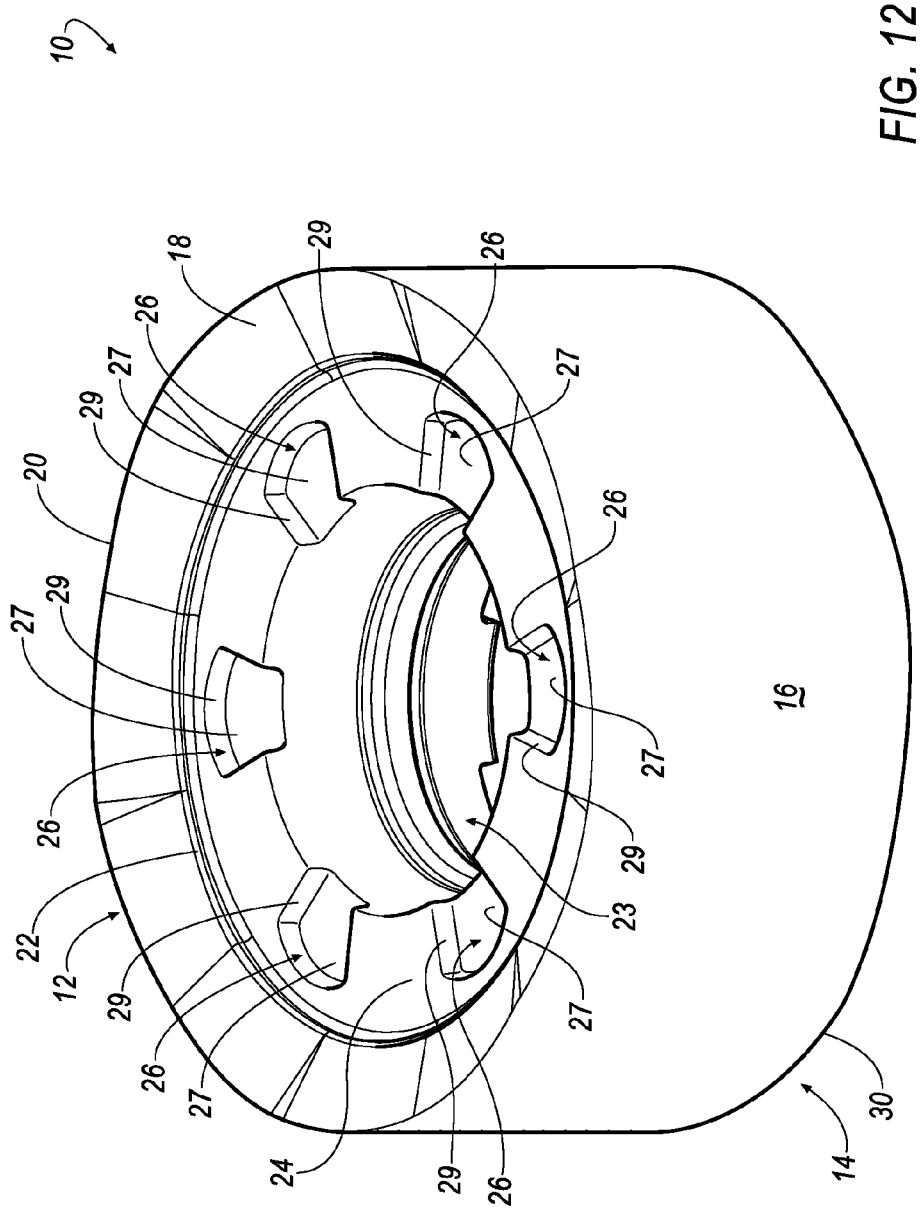
FIG. 12 is a perspective view of a cutting insert according to another aspect of the invention.
Figure 13:
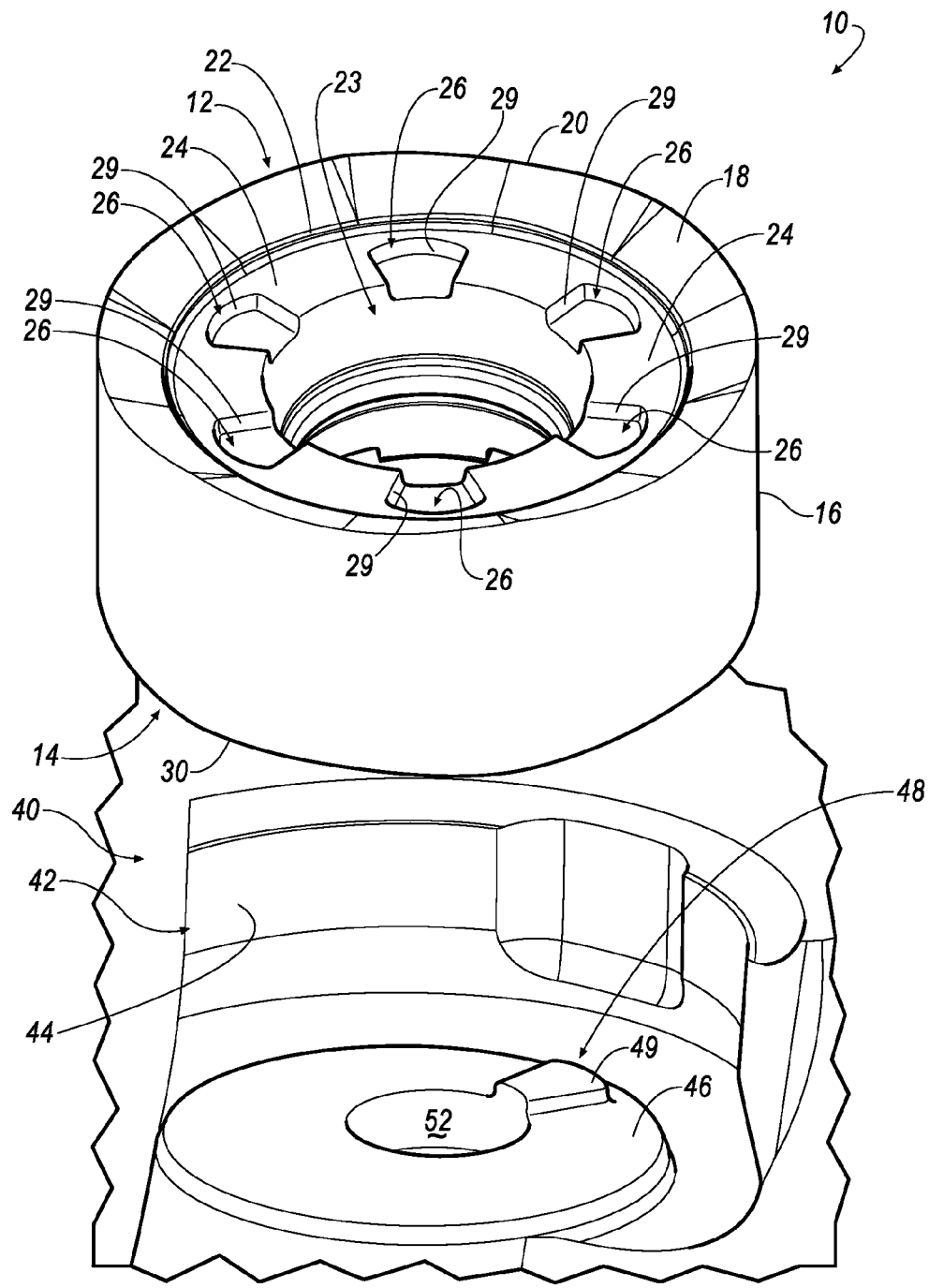
FIG. 13 is a partial, exploded view of a portion of the cutting tool assembly illustrated in FIG. 6 and the cutting insert illustrated in FIG. 12.

In yet another example, the plurality of first dimples 26, the plurality of second dimples 36, and the projection 48 on the insert receiving pocket 42 can have a wagon wheel geometric profile, as shown in FIGS. 12 and 13. In this example, the plurality of first dimples 26 and the plurality of second dimples 36 having the wagon wheel profile cooperates with the single projection 48 on the insert receiving pocket 42 having a complementary wagon wheel profile to prevent rotation of the cutting insert 10 when mounted in the insert receiving pocket 42. It is noted that in this example, the plurality of first and second dimples 26, 36 are not centrally located between the first and second inner edges 22, 32, but are located proximate the non-circular opening 23 in such a way that a portion of the plurality of first and second dimples 26, 36 are in intimate contact with the non-circular opening 23.

Figure 14:
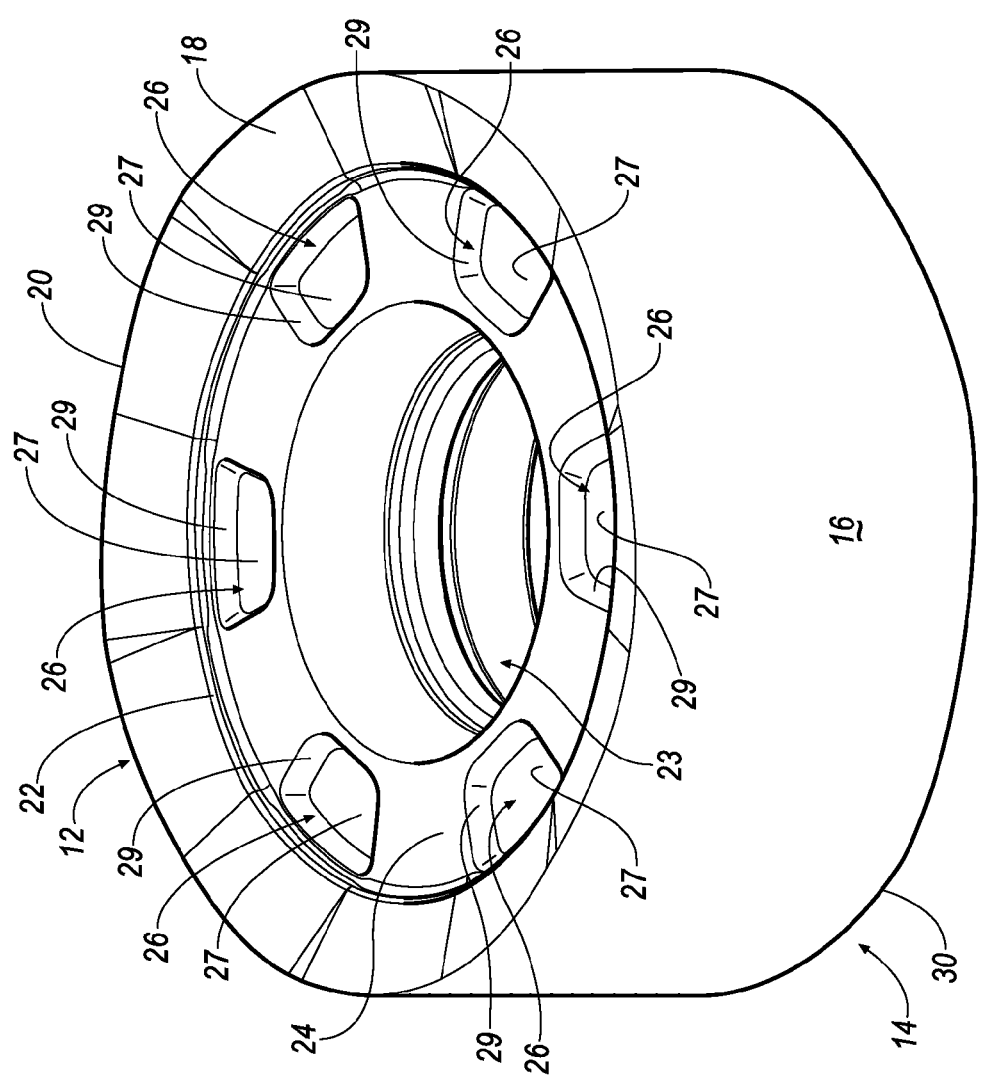
FIG. 14 is a perspective view of a cutting insert according to another aspect of the invention.
Figure 15:
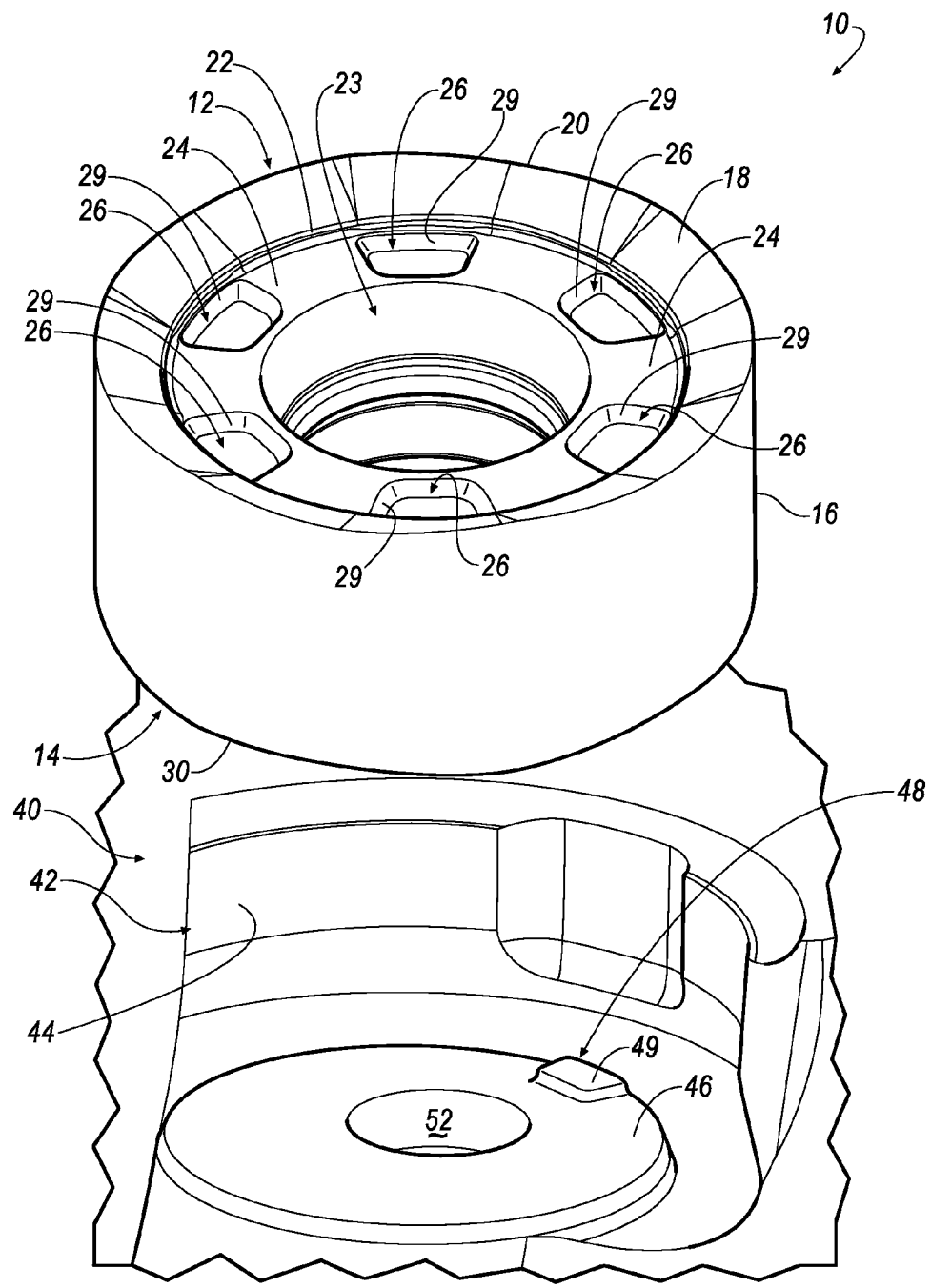
FIG. 15 is a partial, exploded view of a portion of the cutting tool assembly illustrated in FIG. 6 and the cutting insert illustrated in FIG. 14.

In still yet another example, the plurality of first dimples 26, the plurality of second dimples 36, and the projection 48 on the insert receiving pocket 42 can have a sports wheel geometric profile, as shown in FIGS. 14 and 15. In this example, the plurality of first dimples 26 and the plurality of second dimples 36 having the sports wheel profile cooperates with the single projection 48 on the insert receiving pocket 42 having a complementary sports wheel profile to prevent rotation of the cutting insert 10 when mounted in the insert receiving pocket 42. It is noted that in this example, the plurality of first and second dimples 26, 36 are not centrally located between the first and second inner edges 22, 32, but are located proximate the first and second inner edges 22, 32 in such a way that a portion of the plurality of first and second dimples 26, 36 are in intimate contact with the first and second inner edges 22, 32, respectively.

Figure 16:
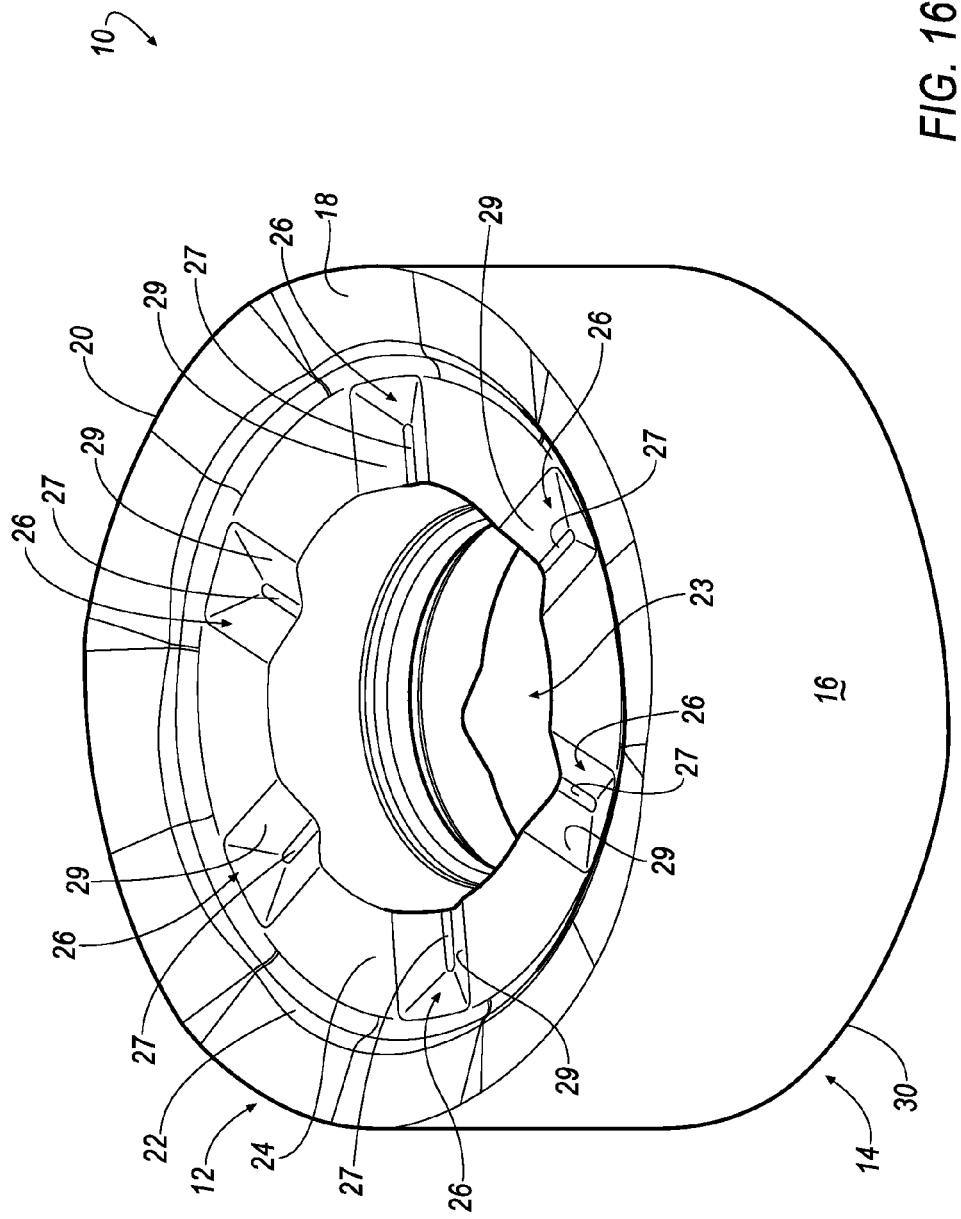
FIG. 16 is a perspective view of a cutting insert according to another aspect of the invention.
Figure 17:
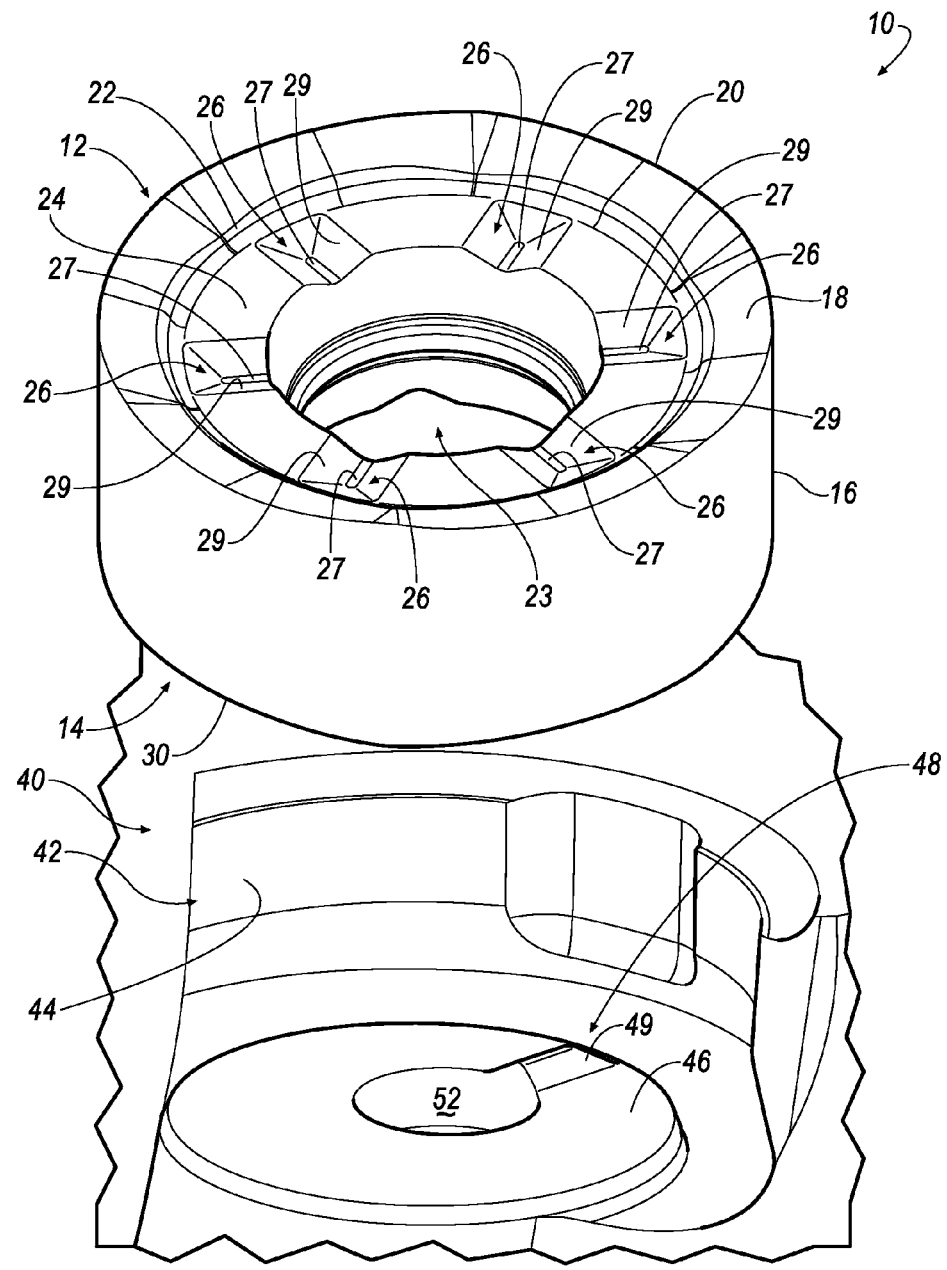
FIG. 17 is a partial, exploded view of a portion of the cutting tool assembly illustrated in FIG. 6 and the cutting insert illustrated in FIG. 16.

In yet another example, the plurality of first dimples 26, the plurality of second dimples 36, and the projection 48 on the insert receiving pocket 42 can have a V-shaped slot geometric profile, as shown in FIGS. 16 and 17. In this example, the plurality of first dimples 26 and the plurality of second dimples 36 having the V-shaped slot profile cooperates with the single projection 48 on the insert receiving pocket 42 having a complementary V-shaped slot profile to prevent rotation of the cutting insert 10 when mounted in the insert receiving pocket 42. It is noted that in this example, the plurality of first and second dimples 26, 36 are not centrally located between the first and second inner edges 22, 32, but are located proximate the non-circular opening 23 in such a way that a portion of the plurality of first and second dimples 26, 36 are in intimate contact with the non-circular opening 23.

Figure 18:
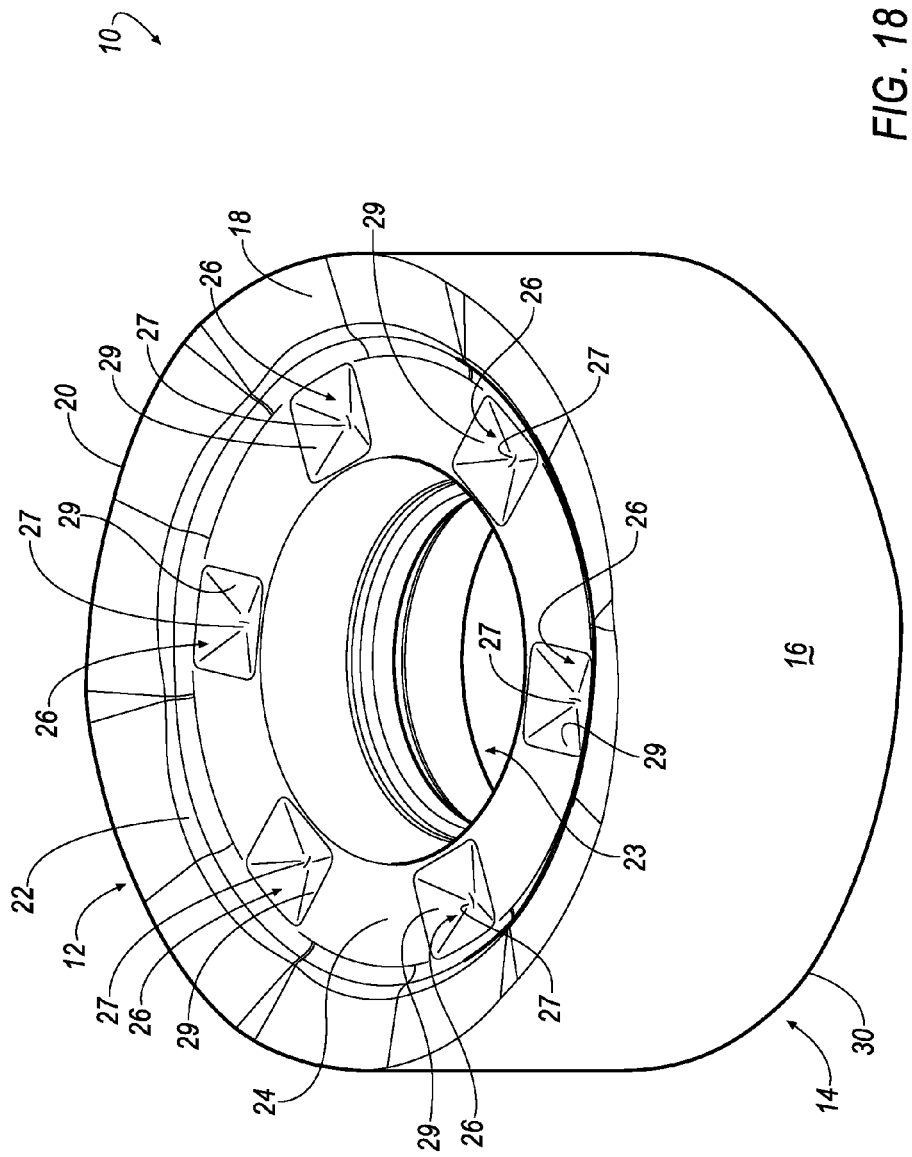
FIG. 18 is a perspective view of a cutting insert according to another aspect of the invention.
Figure 19:
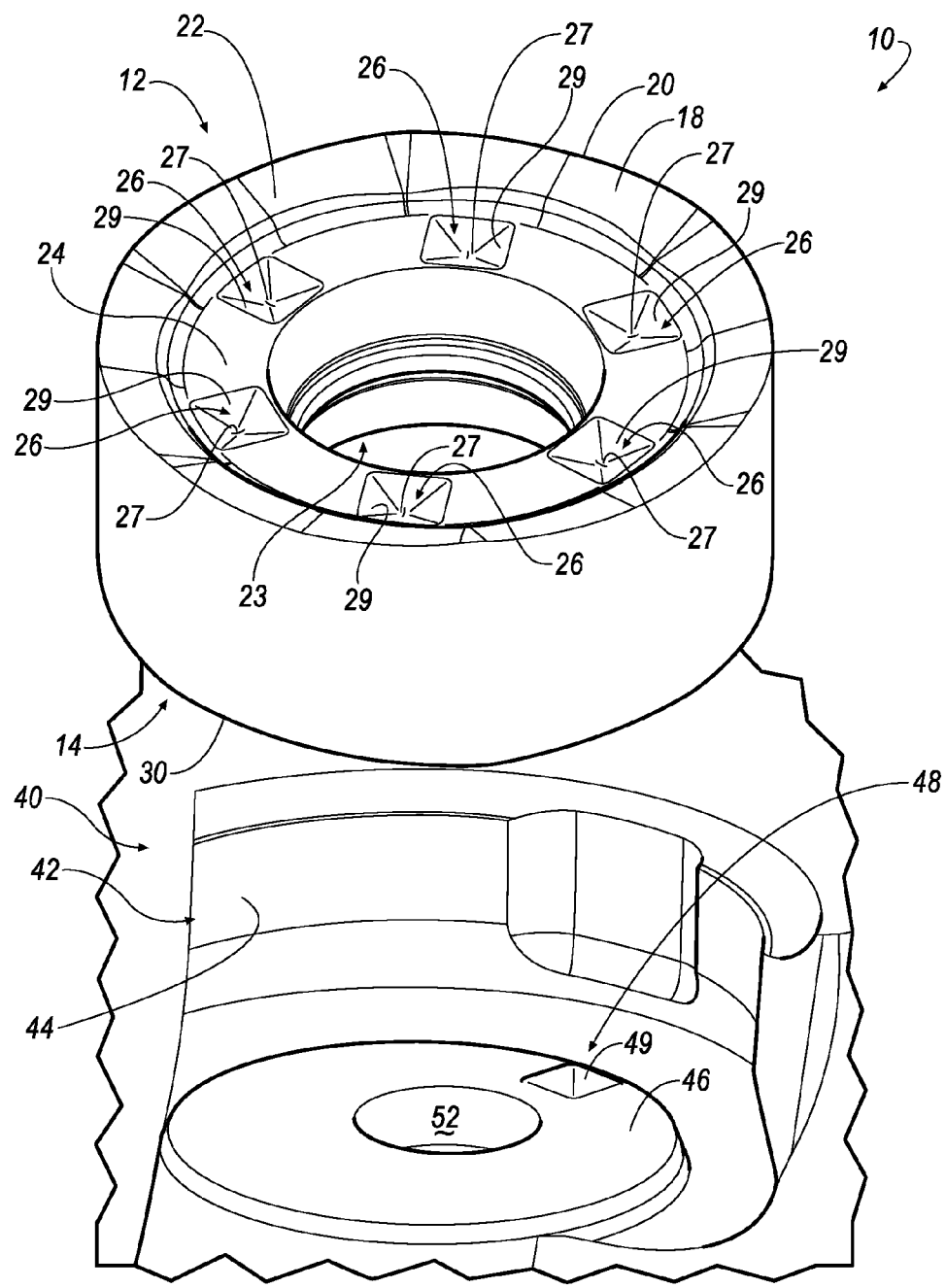
FIG. 19 is a partial, exploded view of a portion of the cutting tool assembly illustrated in FIG. 6 and the cutting insert illustrated in FIG. 18.

In still yet another example, the plurality of first dimples 26, the plurality of second dimples 36, and the projection 48 on the insert receiving pocket 42 can have a pyramid geometric profile, as shown in FIGS. 18 and 19. In this example, the plurality of first dimples 26 and the plurality of second dimples 36 having the pyramid profile cooperates with the single projection 48 on the insert receiving pocket 42 having a complementary pyramid profile to prevent rotation of the cutting insert 10 when mounted in the insert receiving pocket 42.

In each example described above, the geometric profile of the plurality of first and second dimples 26, 36 are complimentary in shape to the single projection 48 on the support surface 46 of the insert receiving pocket 42 such that the projection 48 is capable of being received in one of the plurality of dimples 26, 36 when mounted in the insert receiving pocket 42. In addition, the various geometric profiles for the single projection 48 described above allows the chips produced during a machining operation to flow easily over the projection 48 and prevents chip packing. Further, the various geometric profiles for the single projection 48 described above provides clearance for machining the projection 48, thereby reducing the costs associated with manufacturing the insert receiving pocket.

The patents and publications referred to herein are hereby incorporated by reference.

Having described presently preferred embodiments the invention may be otherwise embodied within the scope of the appended claims.

What is claimed is:

1. A round cutting insert comprising:
   a first outer surface that terminates generally outwardly in a first cutting edge and terminates generally inwardly in a first inner edge;
   a first inner surface extending generally inwardly from the first inner edge toward a non-cylindrical opening that extends axially through the cutting insert;
   a plurality of first dimples formed in the first inner surface between the first inner edge and the opening;
   a second outer surface that terminates generally outwardly in a second cutting edge and terminates generally inwardly in a second inner edge;
   a second inner surface extending generally inwardly from the second inner edge;
   a plurality of second dimples formed in the second inner surface between the second inner edge and the opening; and
   a generally circular side portion that extends between the first outer surface and the second outer surface,
   wherein each of the plurality of first dimples includes a bottom surface and a tapered sidewall extending from the bottom surface to the first inner surface, and wherein each of the plurality of second dimples includes a bottom surface and a tapered sidewall extending from the bottom surface to the second inner surface, and
   wherein one of the plurality of first dimples or one of the plurality of second dimples cooperates with a projection formed on a support surface of an insert receiving pocket in a tool body to prevent rotation of the cutting insert when mounted in the insert receiving pocket.

2. The round cutting insert of claim 1, wherein the plurality of first dimples are evenly circumferentially spaced about the first inner surface, and wherein the plurality of second dimples are evenly circumferentially spaced about the second inner surface.

3. The round cutting insert of claim 1, wherein the first cutting edge is circumferentially disposed about the plurality of first dimples, and wherein the second cutting edge is circumferentially disposed about the plurality of second dimples.

4. The round cutting insert of claim 1, wherein the plurality of first dimples are generally opposed to the plurality of second dimples.

5. The round cutting insert of claim 1, wherein the first outer surface slopes from the first cutting edge toward the first inner edge, and wherein the second outer surface slopes from the second cutting edge toward the second inner edge.

6. The round cutting insert of claim 1, wherein the first outer surface is contained in a plane and the first inner surface is contained in another plane that is non-parallel to the plane containing the first outer surface, and wherein the second outer surface is contained in a plane and the second inner surface is contained in another plane that is non-parallel to the plane containing the second outer surface.

7. The round cutting insert of claim 1, wherein the bottom surface of each of the plurality of first dimples is contained in a plane and the first cutting edge is contained in a different plane, and wherein the bottom surface of each of the plurality of second dimples is contained in a plane and the second cutting edge is contained in a different plane.

8. The round cutting insert of claim 1, wherein the plurality of first dimples are centrally located between the first inner edge and the non-cylindrical opening, and wherein the plurality of second dimples are centrally located between the second inner edge and the non-cylindrical opening.

9. The round cutting insert of claim 1, wherein the cutting insert is indexable.

10. The round cutting insert of claim 1, wherein the cutting insert is reversible.

11. The round cutting insert of claim 1, wherein a geometric profile of the plurality of first dimples, the plurality of second dimples, and the projection is one of a spherical, a slot, a V-shaped, a wagon wheel, a sports wheel, a V-shaped slot and a pyramid geometric profile.

12. A cutting tool assembly, comprising:
    a tool body having an insert receiving pocket with a projection;
    an insert received in the insert receiving pocket, the insert having a first portion having a first outer surface that terminates generally outwardly in a first cutting edge and terminates generally inwardly in a first inner edge; a first inner surface extending generally inwardly from the first inner edge toward a non-cylindrical opening that extends axially through the cutting insert; a plurality of first dimples formed in the first inner surface between the first inner edge and the opening, each of the plurality of first dimples includes a bottom surface and a tapered sidewall extending from the bottom surface to the first inner surface; and a generally circular side surface that extends between the first outer surface and the second outer surface,
    wherein one of the plurality of first dimples cooperates with the projection of the insert receiving pocket to prevent rotation of the insert when mounted in the insert receiving pocket, and
    wherein the insert further comprises a second outer surface that terminates generally outwardly in a second cutting edge and terminates generally inwardly in a second inner edge; a second inner surface extending generally inwardly from the second inner edge; and a plurality of second dimples formed in the second inner surface between the second inner edge and a central opening, wherein one of the plurality of second dimples cooperates with the projection of the insert receiving pocket to prevent rotation of the insert when mounted in the insert receiving pocket.

13. The cutting tool assembly of claim 12, wherein each of the plurality of second dimples includes a bottom surface and a tapered sidewall extending from the bottom surface to the second inner surface.

14. The cutting tool assembly of claim 13, wherein a cross-sectional area of each of the plurality of second dimples is smaller proximate the bottom surface and larger proximate the second inner surface.

15. The cutting tool assembly of claim 12, wherein a cross-sectional area of each of the plurality of first dimples is smaller proximate the bottom surface and larger proximate the first inner surface.

* * * * *